United States Patent [19]

Reiterman

[11] Patent Number: 4,852,438

[45] Date of Patent: Aug. 1, 1989

[54] GENERATING HEAD CUTTING TOOL

[75] Inventor: Lee Reiterman, Royal Oak, Mich.

[73] Assignee: GTE Valenite Corporation, Troy, Mich.

[21] Appl. No.: 95,071

[22] Filed: Sep. 11, 1987

[51] Int. Cl.$^4$ .............................................. B23B 3/00
[52] U.S. Cl. ......................................... 82/131; 82/1.2
[58] Field of Search .......................... 82/2 E, 1.2, 1.4; 74/640, 661

[56] References Cited

U.S. PATENT DOCUMENTS 2,959,065  11/1960  Musser .................................. 74/813
4,599,769  7/1986  Latzko et al. .......................... 82/1.2

Primary Examiner—Robert P. Olszewski
Assistant Examiner—Lawrence Cruz
Attorney, Agent, or Firm—David J. Koris

[57] ABSTRACT

A rotary tool generating head with radial tool slide feed-out produced by differential rotation of central shaft. A harmonic drive gear having a stationary axle and a servo motor driven rotary axle is used to produce zero feedout of the radial slide when the servo driven axle is stationary. Servo controlled radial tool displacement occurs through rotation of the servo driven axle with a substantial reduction in rotational speed with respect to the stationary axle, e.g., in the order of 97:1.

13 Claims, 3 Drawing Sheets

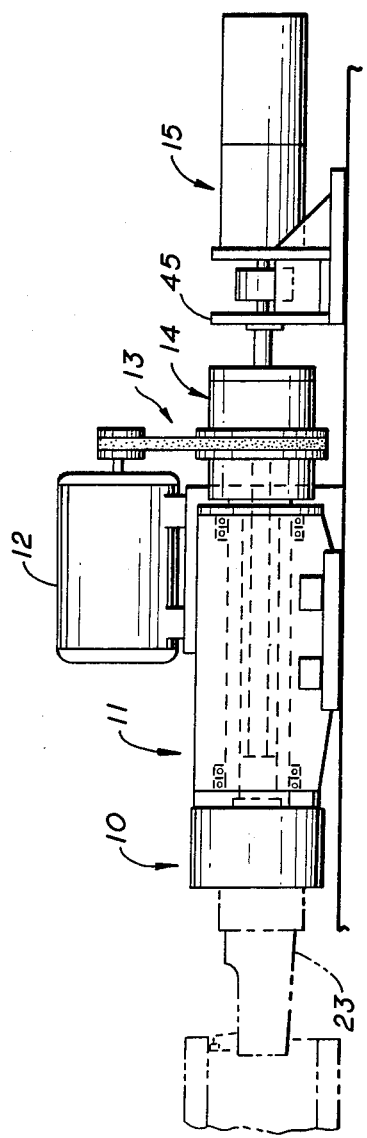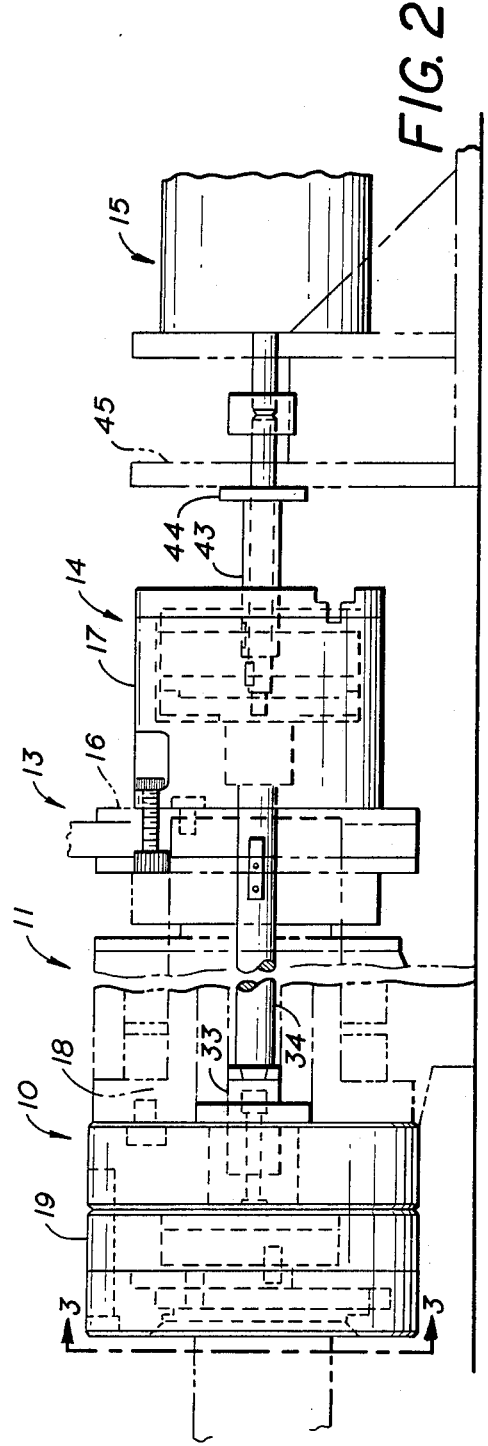

GENERATING HEAD CUTTING TOOL

CROSS-REFERENCE

Copending application, Ser. No. 07/092,807 was filed on Sep. 3, 1987, having common inventorship and assignee with the present invention.

BACKGROUND OF THE INVENTION

"NC" Generating heads including means for producing radial displacement of a cutting tool in a rotating head are known in the art. One example is a commercially available "D'Andrea, NC Controlled Facing and Boring Head" available from Erickson Tool Company, a wholly owned subsidiary of Kennametal Inc., wherein a rotatable spindle head having a transverse cutting tool cross-slide is mounted in a stationary body having an exterior drive system coupling for feeding the radial position of the cutting tool during rotational cutting action.

Another example is disclosed in U.S. Pat. No. 4,040,315 for MACHINING CROSS-FEED HEAD COUNTERWEIGHT SYSTEM wherein a reciprocable drawbar actuated by hydraulic cylinder or otherwise, coaxially with the center of rotation, produces mechanical displacement of a cross-slide on the rotatable tool body. High maintenance requirements for actuating cylinders has created a need for an alternative servo drive. Current servo systems rotate a ball screw which actuates a ball nut coupled to the drawbar which creates axial movement.

BRIEF DESCRIPTION OF THE PRESENT INVENTION

The present invention is directed to employ rotation for the entire generating head system. Instead of controlling radial cross-slide feed through axial drawbar movement, a servo motor is coupled to a rotary harmonic drive which, in addition to acting as a differential, operates as a speed reducer for a rotary shaft passing through the main drive spindle. The harmonic drive creates a differential speed of rotation between the spindle and the rotary shaft which transmits cross-slide feed through a crank link.

BRIEF DESCRIPTION OF THE DRAWINGS

FIG. 1 is a schematic side elevation illustrating the general arrangement of components of a preferred embodiment;

FIG. 2 is an enlarged fragmentary side elevation illustrating the relation of the principle components;

DETAILED DESCRIPTION OF PREFERRED EMBODIMENT

Figure 3:
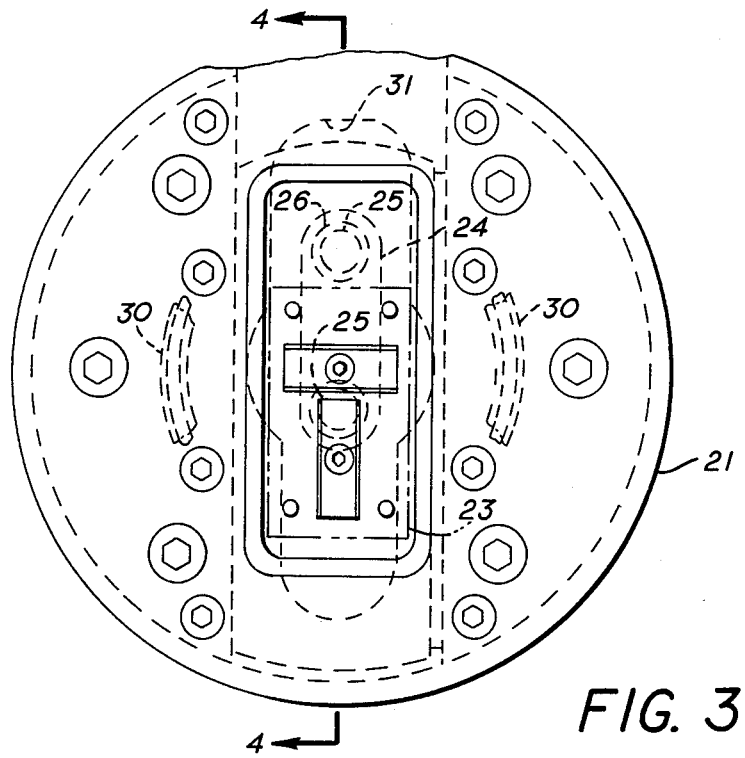
FIG. 3 is a further enlarged face view of the generating head per se taken along the line 3—3 of FIG. 2.

With reference to FIG. 1, principle components of the present system include generating head 10, spindle 11, drive motor 12, drive pully with belt 13, harmonic drive unit 14 and servo motor with drive mounting 15.

With reference to FIG. 2, rotating elements driven by pulley 16 include harmonic drive unit housing 17, hollow spindle 18 and generating head body 19, housing 17 is bolted at its forward-most portion 17 to spindle 18.

Figure 4:
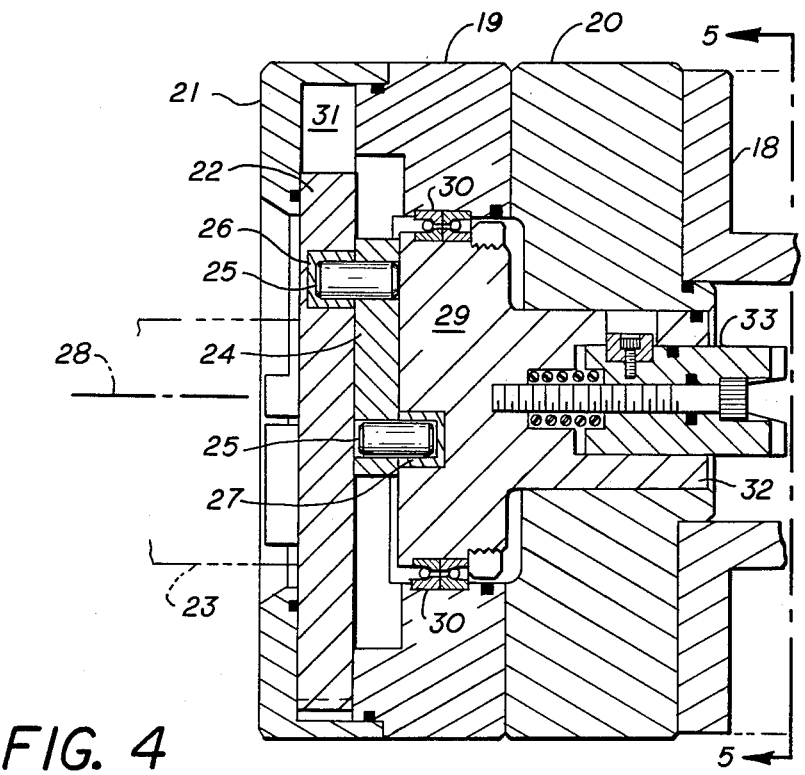
FIG. 4 is a sectional view taken along the line 4—4 of FIG. 3.
Figure 5:
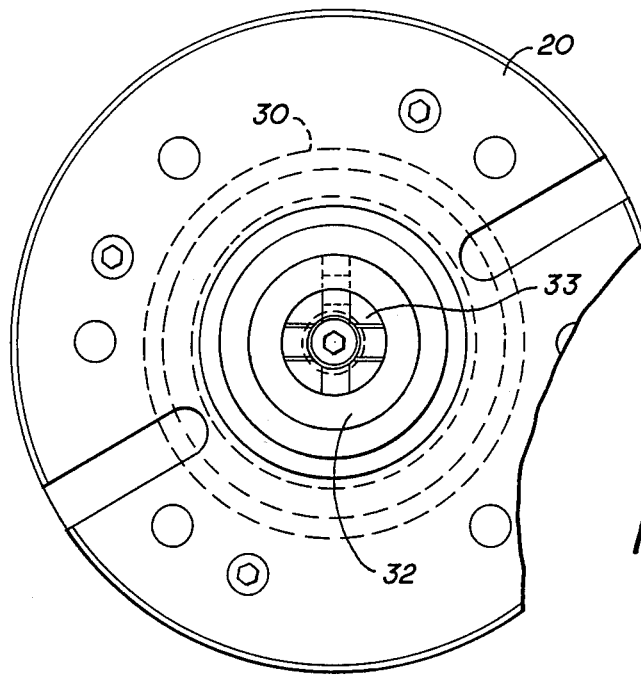
FIG. 5 is a view of the generating head taken along the line 5—5 of FIG. 4.

With reference to FIG. 4, body 19, with connected adapter 20 and cover 21, enclose cross-slide 22 for mounting tool shank 23 actuated by crank link 24 through a pair of dowel pins 25 press fit in link 24 with pivotal connections respectively in roller bearing 26 seated in cross-slide 22 and roller bearing 27 seated in offset relation to rotary center line 28 of adjustment drum 29 mounted by bearings 30 within body 19.

From the foregoing description, it will be understood that rotation of drum 29 and an eccentrically mounted pin 25 in bearing 27 will operate through link 24 as a crank to move slide 22 from the extrmemity position shown to the opposite open space 31 with total feed stroke equal to twice the eccentric positioning of bearing 27.

Figure 6:
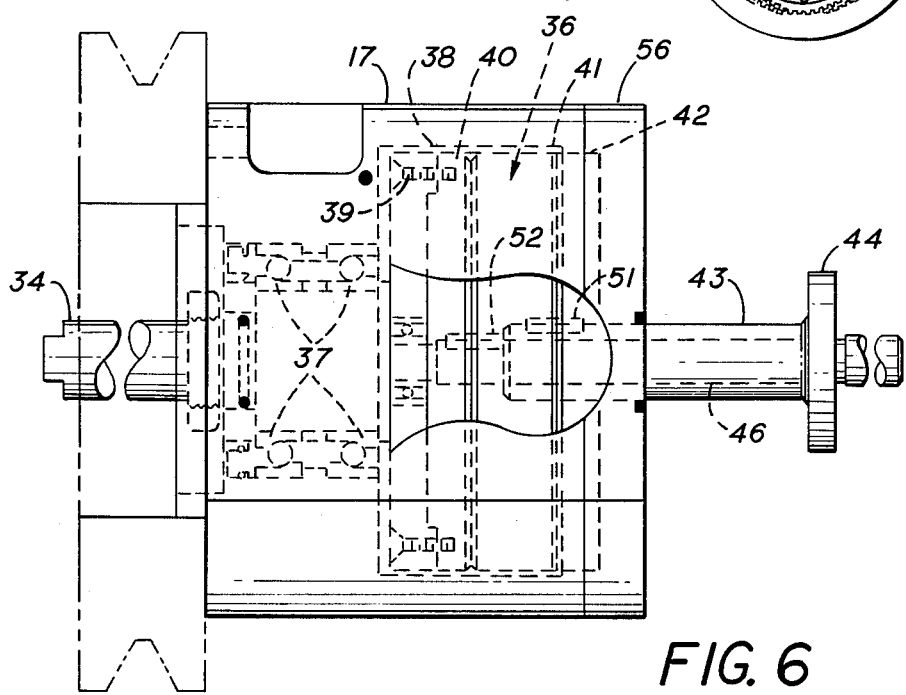
FIG. 6 is an enlarged side elevation of the harmonic drive unit per se for differentially rotating the generating shaft.

Drum 29 including extension 32 within adapter 20 encloses actuating bar 33 connected to rotary shaft 34, as shown in FIG. 2, forming an integral extension of differential output element 40 of harmonic drive 36, as shown in FIG. 6, mounted through bearings 37 within housing 17. Output flange 38 is bolted at 39 to circular spline ring 40 adjacent dynamic spline ring 41 in turn adjacent to circular spline ring 42 fixed within housing 17.

Tubular axle 43 is mounted through flange 44 to stationary bracket 45 (see FIG. 2), while internal axle 46 is driven by servo motor 15 to effect differential rotation of shaft 34 as required to effect radial translation of slide 22.

Figure 7:
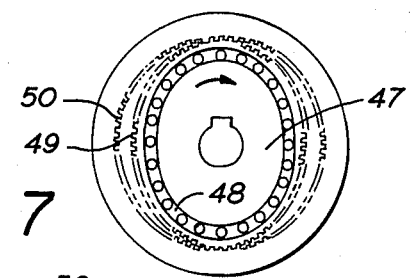
FIG. 7 is an enlarged cross-sectional view of the harmonic drive.

The mechanism of the Harmonic Drive is available from the Harmonic Drive Division of USM Corporation, a subsidiary of Emhart and may be understood with reference to FIG. 7 illustrating the principle of operation.

Three concentric components include elliptical wave generator 47 operating through anti-friction bearings 48 to deflect flexspline 49 having teeth at the elliptical extremities engaging meshing teeth in rigid circular spline 50 with progressive engagement produced by relative rotation of elliptical wave generator 47. As explained in an Emhart Harmonic Drive publication:

"The use of nonrigid body mechanics allows a continuous elliptical deflection wave to be induced in a nonrigid external gear, thereby providing a continuous rolling mesh with a rigid, internal gear.

Since the teeth on the nonrigid Flexspline and the rigid Circular Spline are in continous engagement and since the Flexspline has two teeth fewer than the Circular Spline, one revolution of the input causes relative motion between the Flexspline and the Circular Spline equal to two teeth. Thus, with the Circular Spline rotationally fixed, the Flexspline will rotate in the opposite direction to the input at a reduction ratio equal to the number of teeth on the Flexspline divided by two.

This relative rotation may be seen by examining the motion of a single Flexspline tooth over one-yalf an input revolution.

The tooth is fully engaged when the major axis of the Wave Generator input is at zero degrees. When the Wave Generator's major axis rotates to 90 degrees, the tooth is disengaged. Full reengagement occurs in the adjacent Circular Spline tooth space when the major axis is rotated to 180 degrees. This motion repeates as the major axis rotates another 180 degres back to zero, thereby producing the two tooth advancement per input revolution.

All tabulated Harmonic Drive gear reduction ratios assume the Flexspline is the output member with the Circular Spline rotationally fixed. However, any of the drive elements may function as the input, output or fixed member depending on whether the gearing is used for "speed reduction, speed increasing or differential operation."

As applied to the present system illustrated in FIG. 6, three rigid rings 40, 41 and 42 are employed, each with a circular spline constructed as an internal gear.

A pair of wave generators 47 are employed, as seen at 54, 56, each as an elliptical ball bearing assembly having a flexspline 49 constructed as a nonrigid external gear engaging respectively both the center dynamic spline 41 and one of the outer splines 40, 42. One of said wave generators 47 is keyed to fixed axle tube 43 as shown at 51 and the other is keyed to the servo motor driven axle 46 as shown at 52.

A pair of wave generators are employed, each as an elliptical ball bearing assembly having a flexspline constructed as a nonrigid external gear engaging respectively both the center dynamic spline and one of the outer splines. One of said wave generators is keyed to fixed axle tube 43 as shown at 51 and the other is keyed to the servo motor driven axle 46 as shown at 52. In the typical embodiment illustrated in FIG. 6, each of the outer circular splines is provided with 194 teeth, while each of the flexsplines as well as the center dynamic spline is provided with 192 teeth.

The operation of the harmonic drive gearing when both axles 43 and 46 are stationary, as with the servo motor in brake mode, can be understood by considering the effect of a single revolution of the spindle and housing 17 producing a single revolution of the circular spline 42 relative to the stationary wave generator held by key 51. The passage of 194 teeth will advance the flexspline two teeth past a single revolution which in turn will advance the central dynamic spline as well as the other flexspline each having an equal number of 192 teeth, two teeth past a single revolution, just sufficient to advance output circular splines 40 one revolution, thereby establishing a 1:1 synchronous speed of spindle 18 and shaft 34 corresponding to zero feed for slide 22.

The effect of servo motor rotation of axle 46 may be understood by considering the effect of such rotation with the spindle and housing 17 stationary holding circular spline 42 and central dynamic spline 41 likewise stationary. In such case, rotation of the output wave generator by key 52 one revolution actuating its flexspline with 192 teeth against the stationary dynamic spline having an equal number of teeth will produce zero rotation of the flexspline but a relative two tooth rotation of the output circular spline due to the 194 to 192 tooth differential. Accordingly, any rotational speed of the servo motor driven axle 46 will produce a differential speed of shaft 34 relative to spindle speed equal to servo motor rpm divided by 97.

It will be noted that the 192 to 194 tooth differential between the central dynamic spline and the respective outer splines is necessary to achieve the dual purpose of zero feed when the servo motor is in a brake mode as well as a positive feed from any rotation of the servo motor driven axle 46. Thus, if the central dynamic spline were provided with 194 teeth matching the outer circular spliines, the first objective of zero feed through synchronous drive shaft 34 would be obtained but the second objective of positive feed from rotation of axle 46 would be defeated. This can be understood by considering the spindle and housing 17 to be stationary, locking circular spline 42 and central spline 41 against rotation in which case any rotation of axle 46 and associated wave generator actuation of flexspline engaging central dynamic spline 41 and outer spline 40 would produce no relative movement of outer spline 40.

While the construction of flexsplines having a slightly smaller circumferential dimension to accommodate progressive tooth engagement through the wave generator involves a slightly greater pitch for the central dynamic spline, the division of the respective pitch circle differential over 192 teeth renders the individual tooth pitch differential entirely tolerable without significant lost motion or backlash.

The resulting rotary differential drive for generating heads provides numerous advantages over the conventional reciprocating drawbar. A more compact generating head is possible without need for accommodating drawbar and linkage actuated thereby. In addition, the reciprocating drawbar involves a volume displacement within the head which must be vented to accommodate volume change with consequent potential loss of lubricant, the number one cause for excessive wear. The rotary actuation of the present system, in contrast, accommodates sealed lubrication without displacement change throughout the radially adjustment range.

With reference to FIG. 4 and FIG. 6, it will be seen that the generating mechanism is contained within a fixed volumetric space in the head facilitating lubricant sealing (as shown at 58, 60 and 62 for FIG. 4 and at 64, 66 and 68 for FIG. 6) as constrasted with volumetric displacement involved with axial drawbar actuated systems.

I claim:

1. Rotary tool comprising rotary tool head, radial feed-out tool slide in said head, rotary motor driven spindle with drive connection to said head, rotary shaft within said spindle, means responsive to differential speeds of said respective spindle and shaft for producing radial feed-out of said tool slide, said responsive means including a mechanical link between said shaft and tool slide responsive to relative rotation of said shaft within said head, and harmonic drive means for producing said differential shaft and spindle speeds.

2. The combination of claim 1 including a link with eccentric pivotal connection to said shaft and spaced pivotal connection to said slide serving as a crank for converting relative rotation of said shaft to linear radial movement of said slide.

3. The combination of claim 2 including crank pins pressfit in one element of each pivotal connection engaging roller bearings in the other element of each pivotal connection.

4. The combination of claim 3 wherein said harmonic drive means includes a housing rotating at spindle speed, a fixed axle and concentric rotational axle, said harmonic drive means producing synchronous shaft and spindle speeds when said rotational axle is stationary and differential speeds responsive to rotation of said rotational axle.

5. The combination of claim 4 wherein said harmonic drive means includes a first rigid internally splined ring fixed to rotate with said housing, a second rigid internally splined circular ring connected to rotate with said shaft, an intermediate rigid internally splined dynamic ring, a first elliptical wave generator coupled to said fixed axle having a flexible external spline mounted thereon with anti-friction bearings engaging internal splines of said first and intermediate rings at diametric extremities of said elliptical wave generator, a second elliptical wave generator fixed to said rotational axle having a flexible spline mounted thereon with anit-friction bearings engaging the internal splines of said second and intermediate rings at diametric extremities of said second elliptical wave generator.

6. The combination of claim 5 wherein each of said first and second circular spline rings is provided with two more spline teeth than said flexible splines and said intermeidate spline ring, said intermediate spline ring having slightly greater spline tooth pitch than respective flexible splines to accommodate the differential in respective pitch circumferences together with their respective equal number of teeth.

7. The combination of claim 6 wherein the numbers of spline teeth are respectively in the order of 194 and 192 providing a relative shaft speed differential from spindle speed in the order of driven axle speed divided by 97.

8. The combination of claim 4 including a common motor drive means for said spindle and harmonic drive means housing.

9. The combination of claim 4 including a servo motor for braking and driving said rotational axle.

10. The combination of claim 9 wherein said fixed axle comprises a hollow shaft with a fixed mounting keyed to said first elliptical wave generator, and said rotational axle extends from said servo motor through said fixed axle to a keyed connection with said second elliptical wave generator.

11. The combination of claim 1 including lubricant sealing means within said tool head for said shaft, slide and mechanical linkage means.

12. The combination of claim 5 wherein said spline tooth engagement at elliptical extremities is accompanied by intermediate disengagement to accommodate a two tooth differential for establishing a reduction ratio equal to two divided by the total number of teeth.

13. The combination of claim 1 including a pivoted crank link connection for translating the rotary motion of said shaft to linear radial motion of said slide, and harmonic drive means with servo motor control for establishing synchronous and differential speeds between said spindle and said shaft.

* * * * *